(12) United States Patent
Inoue

(10) Patent No.: US 10,467,264 B2
(45) Date of Patent: Nov. 5, 2019

(54) DEVICE CONTROLLING APPARATUS CONFIGURED TO OBTAIN INFORMATION RELATING TO DEVICE ITSELF AND METHOD FOR CONTROLLING THE DEVICE

(71) Applicant: BROTHER KOGYO KABUSHIKI KAISHA, Nagoya-shi, Aichi-ken (JP)

(72) Inventor: Hiroki Inoue, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 468 days.

(21) Appl. No.: 14/979,993

(22) Filed: Dec. 28, 2015

(65) Prior Publication Data

US 2016/0188718 A1  Jun. 30, 2016

(30) Foreign Application Priority Data

Dec. 26, 2014 (JP) ................................. 2014-266115

(51) Int. Cl.
*G06F 17/30* (2006.01)
*G06F 16/33* (2019.01)

(52) U.S. Cl.
CPC ............................... *G06F 16/3331* (2019.01)

(58) Field of Classification Search
CPC .............................................. G06F 17/30657
See application file for complete search history.

(56) References Cited

U.S. PATENT DOCUMENTS

| 6,185,527 | B1* | 2/2001 | Petkovic | G06F 17/30746 |
| | | | | 704/231 |
| 2008/0154874 | A1* | 6/2008 | Schilit | G06F 17/30672 |
| 2008/0183668 | A1* | 7/2008 | Bhamidipaty | G06F 11/079 |
| 2010/0306249 | A1* | 12/2010 | Hill | G06F 17/30867 |
| | | | | 707/769 |
| 2011/0302172 | A1* | 12/2011 | Chandrasekar | G06F 17/30672 |
| | | | | 707/748 |
| 2014/0372367 | A1* | 12/2014 | McLean | G06F 21/6218 |
| | | | | 707/603 |

(Continued)

FOREIGN PATENT DOCUMENTS

JP  2002-244954 A  8/2002
JP  2008-46713 A  2/2008

*Primary Examiner* — Syed H Hasan
(74) *Attorney, Agent, or Firm* — Scully, Scott, Murphy & Presser, P.C.

(57) ABSTRACT

A device controlling program causes, when executed, a processor to perform: receiving input of an input word; searching function information stored in a memory and obtaining a first search result relating to the input word, the first search result being included in the function information, the function information including at least one of a function of the device controlling program and a function of the device; in response to obtaining no first search result relating to the input word as a result of the search process, determining a search word including the input word and a related word identifying at least one of the device controlling program and the device, and transmitting a search request to the server for a second search result, the search request including the search word; and in response to receiving the second search result from the server, displaying the second search result on a display.

20 Claims, 10 Drawing Sheets

(56) References Cited

U.S. PATENT DOCUMENTS

2015/0161149 A1* 6/2015 Genera ............... G06F 17/3087
                                                            707/711
2017/0286548 A1* 10/2017 De .................... G06F 17/30867
2017/0293943 A1* 10/2017 Harrison ............ G06Q 30/0269

* cited by examiner

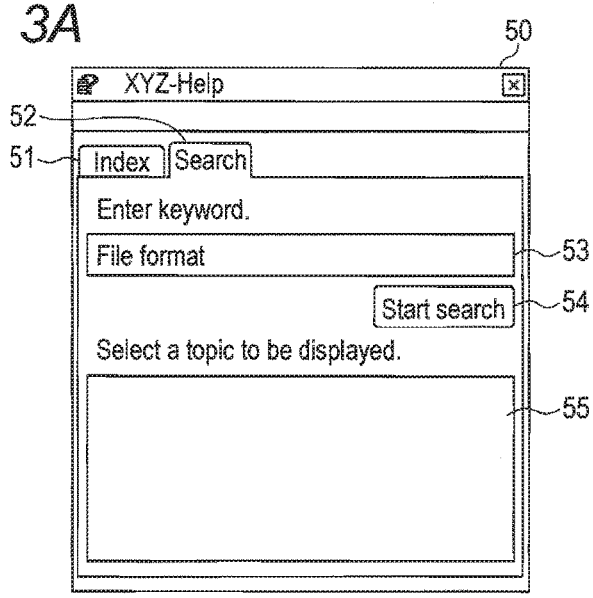
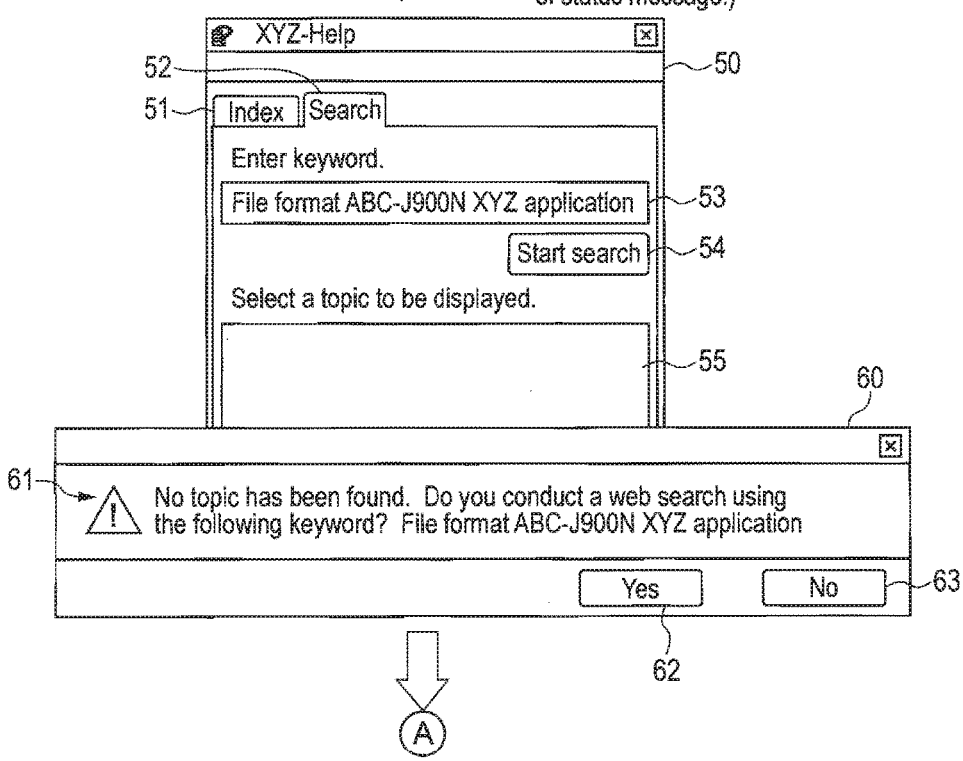

FIG. 5A
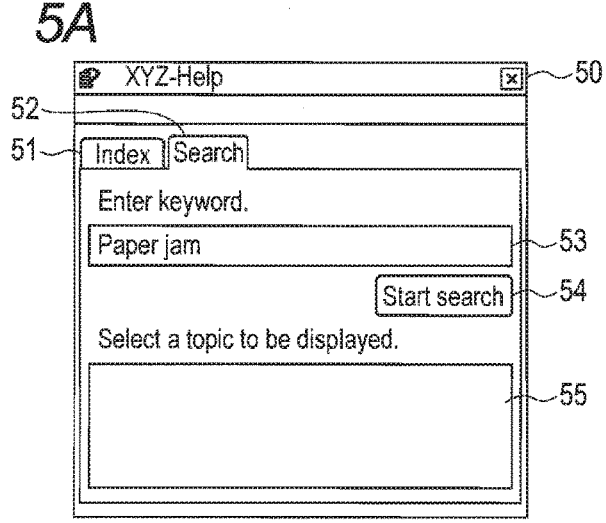
FIG. 5B
(No appropriate topic has been found by using Help-search.)
(Keyword has been found in the list of status message.)
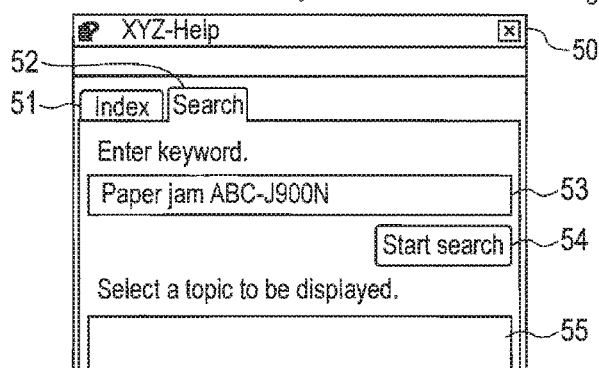
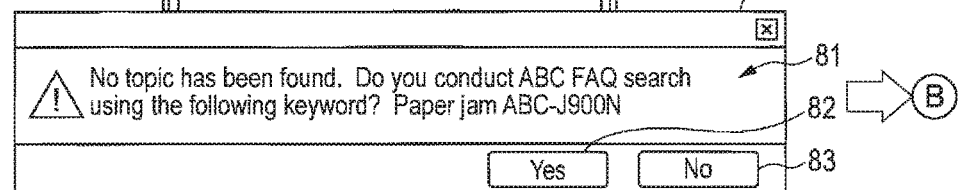
FIG. 5C
(Not found in FAQ database on ABC website.)
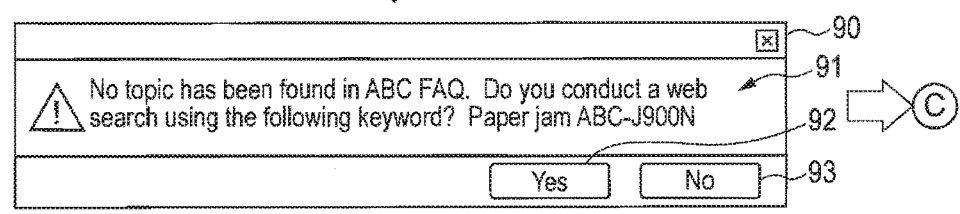

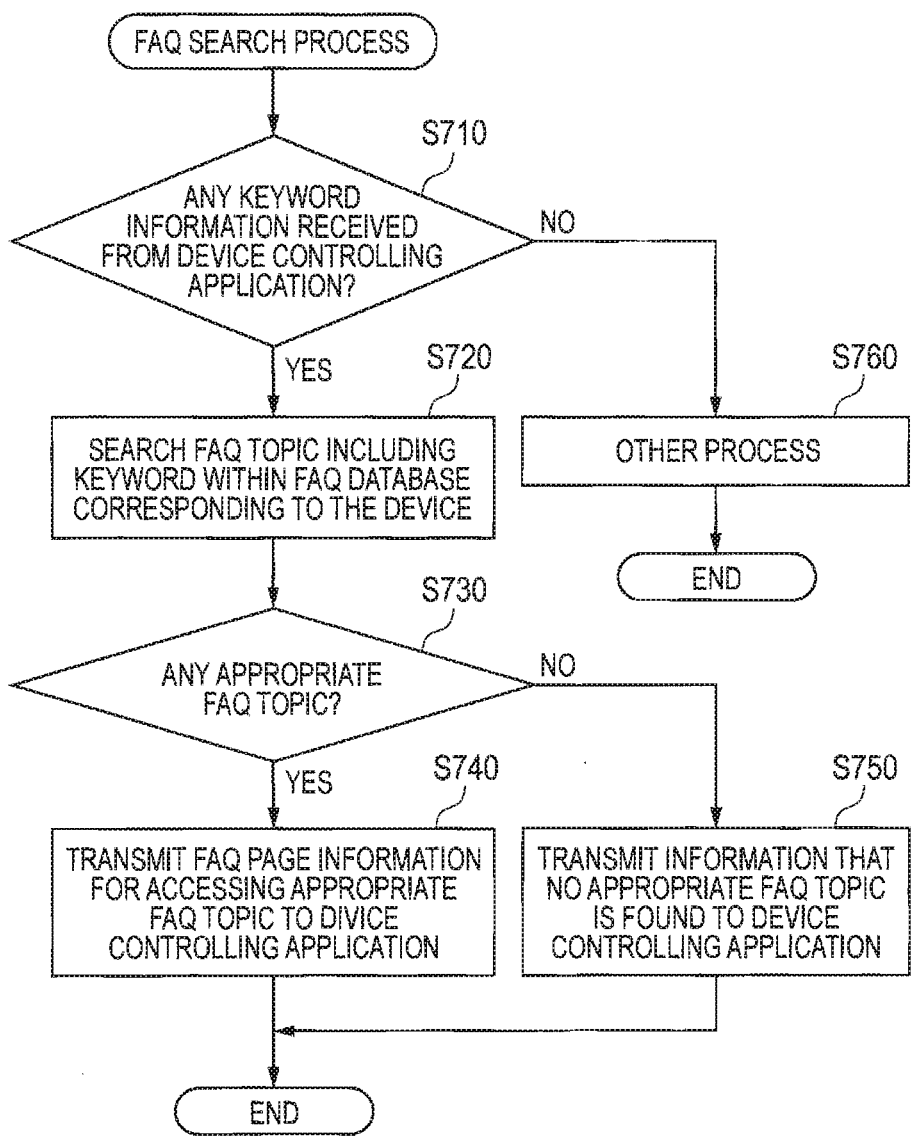

DEVICE CONTROLLING APPARATUS CONFIGURED TO OBTAIN INFORMATION RELATING TO DEVICE ITSELF AND METHOD FOR CONTROLLING THE DEVICE

CROSS REFERENCE TO RELATED APPLICATIONS

This application claims priority from Japanese Patent Application No. 2014-266115 filed Dec. 26, 2014. The entire content of the priority application is incorporated herein by reference.

TECHNICAL FIELD

This disclosure relates to a device controlling apparatus for controlling a device having a particular function, a device controlling method used by the device controlling apparatus, and a device controlling program for allowing a computer to function as a device controlling apparatus.

BACKGROUND

It is common that various devices such as printer and scanner are controlled from various information processing apparatuses such as a personal computer (hereinafter, refer to as "PC") and a server by connecting those various devices with those various information processing apparatuses.

When controlling a device from an information processing apparatus, in general, firstly, an application software for controlling the device (hereinafter, refer to as "device controlling application") is installed in the information processing apparatus. Then, the device is controlled by using the device controlling application.

In a case where a user operates the device controlling application in the information processing apparatus: a problem occurs with the device and the user may wish to obtain information for troubleshooting; or the user may also wish to know the device information and how to use the device controlling application. In such cases, it may be convenient if the user could easily obtain the necessary information.

With regard to the above, for instance, it is proposed to receive, from a Web server, information relates to a screen displayed when a help button is clicked.

SUMMARY

According to one aspect, this specification discloses a non transitory computer-readable storage medium storing a device controlling program executable by a processor of an information processing apparatus. The information processing apparatus is configured to be connected to a device and a server. The device controlling program causes, when executed, the processor to perform: an input receiving process of receiving input of an input word; a search process of searching function information stored in a memory of the information processing apparatus and obtaining a first search result relating to the input word, the first search result being included in the function information stored in the memory, the function information including at least one of a function of the device controlling program and a function of the device; a first displaying process of displaying the first search result on a display of the information processing apparatus; a first search requesting process of, in response to obtaining no first search result relating to the input word as a result of the search process, determining a search word including the input word and a related word identifying at least one of the device controlling program and the device, and transmitting a search request to the server for a second search result, the search request including the search word; and a second displaying process of, in response to receiving the second search result from the server, displaying the second search result on the display of the information processing apparatus.

According to another aspect, this specification also discloses a device controlling method usable on an information processing apparatus configured to be connected to a device and a server. The device controlling method includes: receiving input of an input word; searching function information stored in a memory of the information processing apparatus and obtaining a first search result relating to the input word, the first search result being included in the function information stored in the memory, the function information including at least one of a function of the device controlling program and a function of the device; displaying the first search result on a display of the information processing apparatus; in response to obtaining no first search result relating to the input word as a result of the searching, determining a search word including the input word and a related word identifying at least one of the device controlling program and the device, and transmitting a search request to the server for a second search result, the search request including the search word; and in response to receiving the second search result from the server, displaying the second search result on the display of the information processing apparatus.

According to still another aspect, this specification also discloses a device controlling apparatus. The device controlling apparatus includes a display, a communicator, a processor, and a memory. The display is configured to display information. The communicator is configured to perform data communication with a device and a server. The memory stores a device controlling program for controlling the device. The memory further stores function information that is information including at least one of a function of the device controlling program and a function of the device. The device controlling program includes instructions, when executed by the processor, causing the processor to perform: an input receiving process of receiving input of an input word; a search process of searching the function information and obtaining a first search result relating to the input word, the first search result being included in the function information stored in the memory; a first displaying process of displaying the first search result on a display of the information processing apparatus; a first search requesting process of, in response to obtaining no first search result relating to the input word as a result of the search process, determining a search word including the input word and a related word identifying at least one of the device controlling program and the device, and transmitting a search request to the server for a second search result, the search request including the search word; and a second displaying process of in response to receiving the second search result from the server, displaying the second search result on the display.

BRIEF DESCRIPTION OF THE DRAWINGS

Embodiments in accordance with this disclosure will be described in detail with reference to the following figures wherein:

FIGS. 3A and 3B are explanatory diagrams showing an example of screen transition in a case of proceeding to Web search when no appropriate topic is found by help search;

FIGS. 5A, 5B, and 5C are explanatory diagrams showing an example of screen transition in a case of proceeding to FAQ search and further proceeding to Web search as necessary when no appropriate topic is found by help search;

FIG. 10 is a flowchart showing an FAQ search process.

DETAILED DESCRIPTION

However, according to the above-described technology, the user may obtain information based on the content of the screen displayed when the help button is clicked; the obtained information may not be what the user needs to find. Therefore, it is hard to say that the information required by the user is efficiently obtained. When the amount of information displayed in the screen is larger, the problem becomes more remarkable.

In addition, because communication with the Web server is performed each time the help button is clicked, communication traffic may be affected. If the information processing device, such as a smartphone and a tablet device, is set to use a mobile telephone network for communication with the Web server, data communication charge will be billed; which may become another problem.

An example of the objective of an aspect of this disclosure is to provide technology to suppress data communication between an information processing apparatus and an external server and to efficiently obtain information, needed by the user, which relates to the device itself, a method for controlling the device, and so on.

Hereinafter, an aspect of this disclosure will be described while referring to the accompanying drawings.

(1) Configuration of Image Processing System 1

Figure 1:
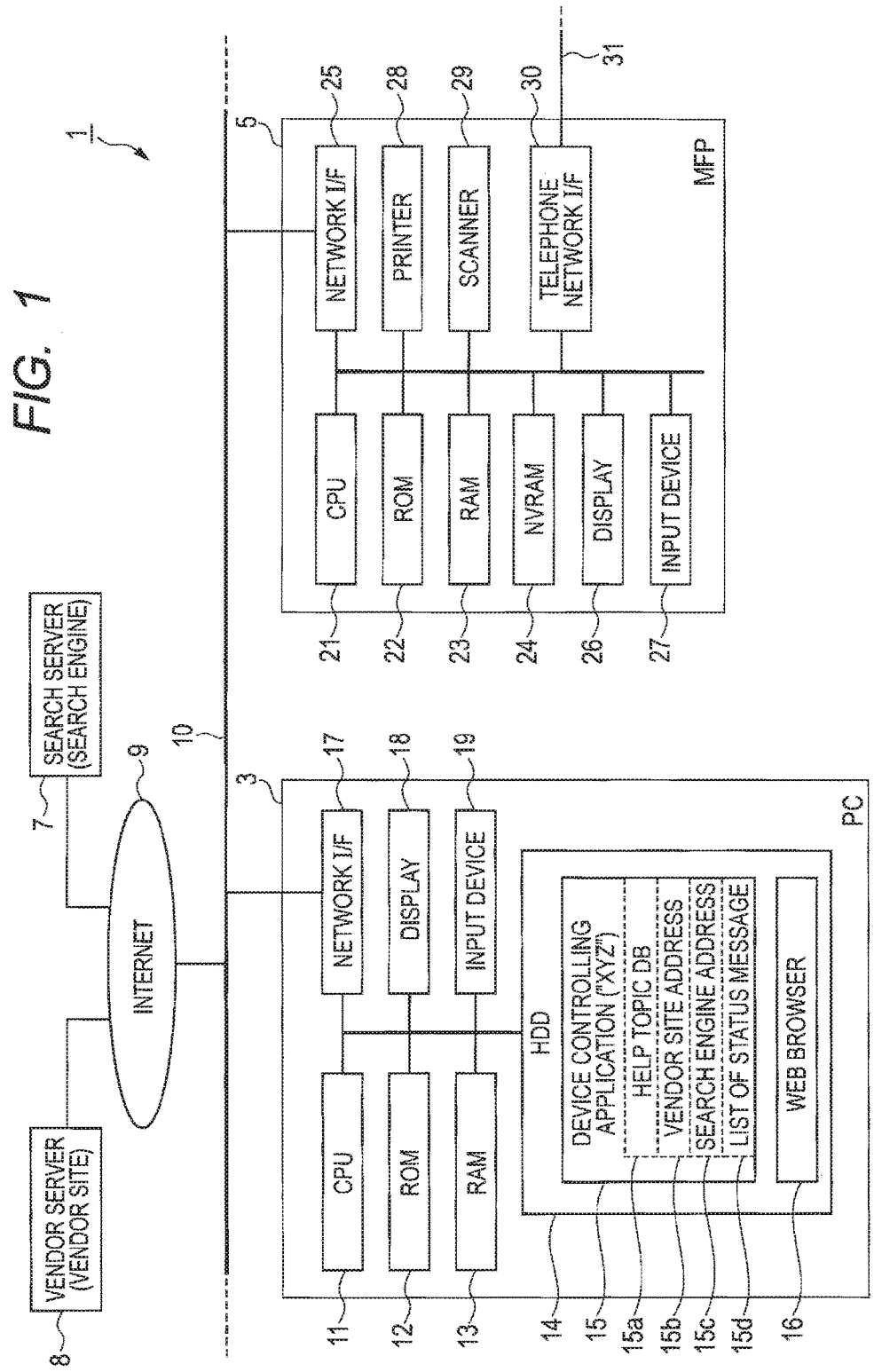
FIG. 1 is a schematic diagram showing the overall configuration of an image processing system according to an embodiment.

As shown in FIG. 1, the image processing system 1 of the present embodiment includes a PC 3 and a Multifunction Peripheral (hereinafter, refer to as "MFP") 5. The PC 3 and the MFP 5 are connected with each other through a network 10 so as to perform data communication. The network 10 in this embodiment is a wired LAN. However, this is an example; other types of network may also be used.

The PC 3 and the MFP 5 are configured to connect to an Internet 9; the PC 3 and the MFP 5 are also configured to connect to other information processing devices through the Internet 9. The information processing devices, to which the PC 3 can be connected through the Internet 9, include a search server 7 and a vendor server 8 both shown in FIG. 1. The PC 3 is configured to download necessary information from each server 7, 8 through the Internet 9 and to upload information to each server 7, 8 through the Internet 9.

(2) Configuration of the PC 3

The PC 3 includes a CPU 11, a ROM 12, a RAM 13, a hard disk drive (hereinafter, refer to as "HDD") 14, a network I/F 17, a display 18, an input device 19, and so on.

The CPU 11 controls each part of the PC 3 by executing programs stored in the ROM 12 and HDD 14. The ROM 12 stores therein various programs and data to be executed by the CPU 11. The RAM 13 is used as a main memory in order for the CPU 11 to execute various processing. The network I/F 17 is a communication module for conducting various data communication with external devices through the network 10. The display 18 includes a display device such as liquid crystal display. The input device 19 includes a mouse, a keyboard, and so on (not shown) operated by the user.

(3) Configuration of the MFP 5

The MFP 5 is a multifunction peripheral device having a scanning function to scan image of an original document; a printing function to form (print) an image on a recording medium such as recording paper and OHP sheet; a facsimile function to transmit and receive facsimile data. The printing function includes a copying (photocopying) function to print an image of an original document scanned by the scanning function.

The MFP 5 includes a CPU 21, a ROM 22, a RAM 23, a non-volatile RAM (hereinafter, refer to as "NVRAM") 24, a network I/F 25, a display 26, an input device 27, a printer 28, a scanner 29, a telephone network I/F 30, and so on.

The CPU 21 controls each unit inside the MFP 5 in accordance with various programs stored in the ROM 22 and the NVRAM 24. The RAM 23 is used as a work area for storing various types of information and as a main memory configured to store image data. The NVRAM 24 is a non-volatile memory in which a stored content can be electrically rewritable, and firmware, various setting values, various programs, and different types of data are stored therein.

The display 26 includes various types of display devices such as liquid crystal display and LED. The input device 27 includes a touch panel and various types of manual operation buttons. The input device 27 accepts inputting operation by the user. The printer 28 is configured to form and print an image on a printing medium such as printing paper. The printer 28 realizes the printing function. The printer 28 is configured to print, on a printing medium, an image based on an image data received from the PC 3 via the network 10. The scanner 29 includes an image sensor. The scanner 29 reads an image of an original document and generates the image data. The scanner 29 realizes the scanning function. In addition, a combination of the scanner 29 and the printer 28 realizes the copying function.

The network I/F 25 is a communication module for performing various data communication with external devices (for example, the PC 3) through the network 10. The telephone network I/F 30 is a network interface for performing communication (for example, telephone and facsimile communication) with external communication devices through a communication network 31. The telephone network I/F 30 realizes the facsimile function. In other words, the MFP 5 is configured to transmit and receive facsimile data to and from the external device through the communication network 31.

The facsimile function can be subdivided into at least a normal facsimile function and a PC-FAX function. The normal facsimile function is a function of reading an image of an original document by the scanner 29 and then performing facsimile transmission of the scanned image data from the telephone network I/F 30 through the communication network 31, and of making the printer 28 print the reception data of facsimile transmission received through the communication network 31.

On the other hand, the PC-FAX function includes both of: a transmitting function to perform facsimile transmission of data, which is received from the PC 3 through the network 10, from the telephone network I/F 30 to a specified address through the communication network 31; and a receiving function to transmit the data, which is received through the communication network 31, to the PC 3 through the network 10. Note that the PC-FAX function may have either one of the transmitting function and the receiving function.

(4) Configuration of the Servers 7, 8

The search server 7 includes a particular search engine. The search engine is a widely known search system where it searches Web pages for a keyword specified by the user among a plurality of servers connected to the Internet 9 (not shown in detail) and then provides the received Web page information to the user. The examples of well-known search engine may be GOOGLE™ and YAHOO! ™.

The vendor server 8 is managed by a vendor (product supplier) of the MFP 5. The vendor server 8 stores information of the vendor site which is a Web site of the vendor of the MFP 5. The PC 3 and the MFP 5 can access the vendor site of the vendor server 8 through the Internet 9, and receive information about the vendor and the products thereof and also download various kinds of software.

The vendor server 8 stores an FAQ database which includes: questions received from many users or assumed questions regarding the product provided by the vendor; and the answers to those questions. Specifically, a question and the corresponding answer are coupled as one FAQ topic. A plurality of such FAQ topics is stored in the vendor server 8 as the FAQ database. The FAQ topics are provided to the user as one of various Web pages (FAQ page) configuring the vendor site.

(5) Configuration of Software of the PC 3

In the HDD 14 of the PC 3, various types of software are installed. The software includes an operating system (hereinafter, refer to as "OS") and various kinds of application software (hereinafter, refer to as "application"). Such various applications include the device controlling application 15 and the Web browser 16.

Note that, in this embodiment, the vendor of the MFP 5 is named "ABC Company (ABC Co.)", a name of the device controlling application 15 provided from ABC Co. through the network or a medium is called "XYZ". These names will be used appropriately in the following description.

Also, in the following description, the CPU 11 which executes various programs such as OS, the device controlling application 15, and the Web browser 16 may be simply referred to by the program name. For instance, a description "the device controlling application 15" may indicate "the CPU 11 executing the device controlling application 15".

The device controlling application 15 is an application for controlling various functions of the MFP 5 from the PC 3. By installing the device controlling application 15 in the PC 3, the various functions of the MFP 5 can be controlled and used from the PC 3.

The device controlling application 15 is configured to control not only the MFP 5 shown in FIG. 1 but also a plurality of devices. For example, by connecting, to the PC 3, a plurality of MFPs of the same model as the MFP 5, the device controlling application 15 selectively controls the plurality of MFP. Moreover, for example, in addition to the MFP 5, when other models of MFPs supplied by the vendor are connected to the PC 3, the device controlling application 15 selectively controls the MFP 5 and the other MFPs.

Furthermore, the device controlling application 15 has a help function. The help function is a function to provide information about functions of the device controlling application 15 itself and functions of the controllable devices. The information provided by the help function is prepared in advance as a help topic database 15a which is a collection of topics related to each of the above-described functions. Hereinafter, database is referred to as "DB".

When the help function is started by the user and a keyword is inputted therein, the device controlling application 15 searches for an appropriate topic that falls under the inputted keyword (namely, the topic including the keyword or the topic related to the keyword). Hereinafter, this type of search is referred to as "help search". The device controlling application 15 executes the help search and then displays the search results. The detail of the help function will be described later.

In addition, during execution of the help function, as necessary, the device controlling application 15 accesses an external server to receive information and displays the received information. The server which the device controlling application 15 accesses during execution of the help function includes at least the search server 7 and the vendor server 8. More specifically, regarding the search server 7, the device controlling application 15 accesses the search engine and requests search of Web pages. Regarding the vendor server 8, the device controlling application 15 accesses the vendor site and requests the below-described FAQ search. The device controlling application 15 preliminarily stores a vendor site address 15b that is a URL address for accessing the vendor site, and a search engine address 15c that is a URL address for accessing the search engine of the search server 7.

Moreover, the device controlling application 15 includes a status monitoring function. The status monitoring function is a function to monitor the operation of devices to be controlled by the device controlling application 15 and to display a message showing the monitored results. A plurality of messages to be displayed in the monitoring function is prepared in advance as a list of status message 15d. Examples of the messages prepared in the list of status message 15d include "Printing is available", "Paper jam occurs", "Toner is running out", "The cover is left open", and so on.

(6) Description Regarding Help Function of the Device Controlling Application

Among functions of the device controlling application, particularly the help function will be described in detail. When the device controlling application 15 is started in the PC 3, the device controlling application 15 displays a main screen 40 shown in FIG. 2A on the display 18.

Figure 2A:
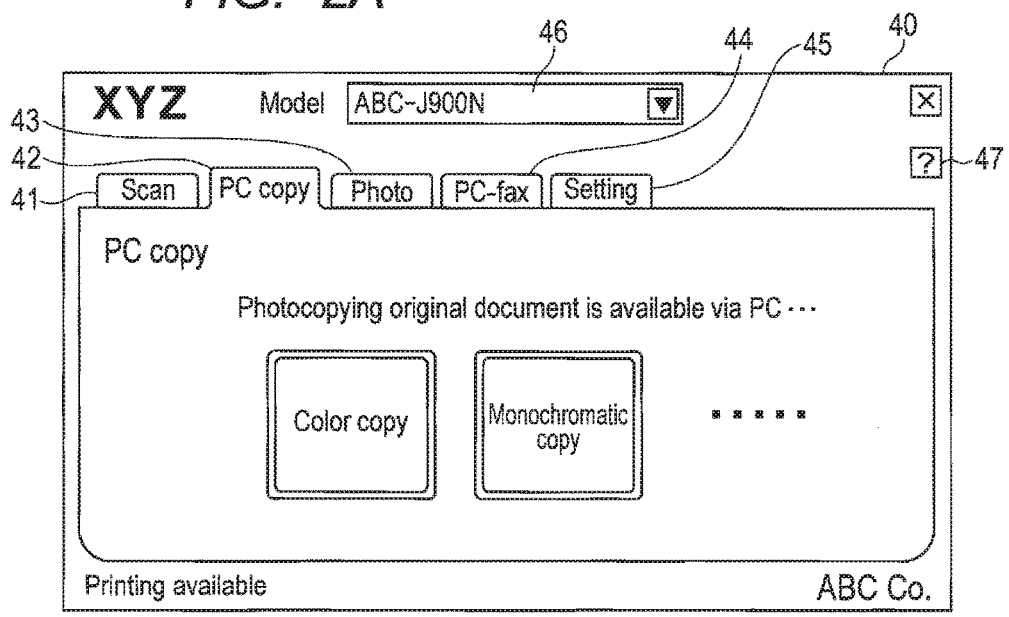
FIGS. 2A and 2B are explanatory diagrams showing an example of screen transition in a case where a help function is started from a main screen of a device controlling application.

The main screen 40 displays a scan tab 41, a PC copy tab 42, a photo tab 43, a PC-FAX tab 44, a setting tab 45, a device specifying box 46, a help button. 47, and so on. FIG. 2A illustrates a state of the main screen 40 in which the PC copy tab 42 among the tabs 41-45 is selected and the content of the PC copy tab 42 is shown.

By selecting the PC copy tab 42, the copy function of the MFP 5 can be controlled and used from the PC 3. By selecting the scan tab 41, the scan function of the MFP 5 can be controlled and used. By selecting the photo tab 43, the function such as printing photo images and transmitting E-mails can be controlled and used. By selecting the PC-FAX tab 44, the PC-FAX function of the MFP 5 can be controlled and used. By selecting the setting tab 45, various settings of relating to the functions of the device controlling application 15 can be performed.

Among various devices usable from the PC 3 (basically, devices on which a driver is installed in the PC 3), a list of name of devices that can be controlled by the device controlling application 15 is shown in the device specifying box 46. Note that the device specifying box 46 is a pull-down type box, and one device name is usually shown.

In the device specifying box 46, device name of active device is usually displayed directly. The active device, in this embodiment, means a device which is set as "Default Device" in the OS. If a device which cannot be controlled by the device controlling application 15 is set as "Default Device" in the OS, when the device controlling application 15 is started, the device controlling application 15 forcibly sets a particular device, which can be controlled by the device controlling application 15, connected to the PC 3 as a "Default Device" (that is, active device). Then, the device controlling application 15 shows a device name of the active device in the device specifying box 46 on the main screen 40. Needless to say, if there is a plurality of devices that can be controlled by the device controlling application 15 (controllable devices), the user can display a pull-down list of the plurality of controllable devices and choose a particular device to set it as the active device. A method for determining the active device is not particularly limited.

Figure 2B:
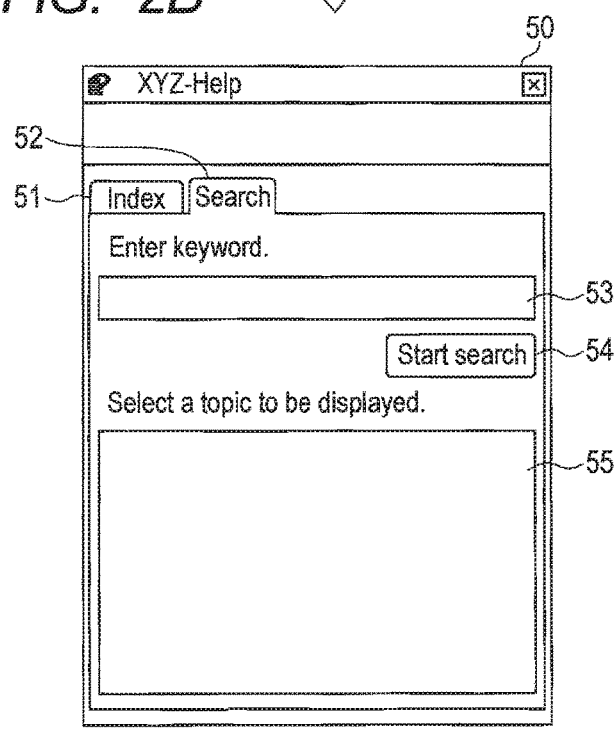

In the main screen 40, when the user presses (e.g. clicks) the help button 47, the device controlling application 15 starts the help function and displays a help screen 50 shown in FIG. 2B. The help screen 50 displays an index tab 51 and a search tab 52. When the index tab 51 is selected, a list of categories related to topics provided by the help function is displayed. By specifying a particular category among those categories, the user can display a list of topics belonging to the particular category.

FIG. 2B illustrates a state where the search tab 52 is selected. The search tab 52 displays a keyword input field 53, a search button 54, and a help topic display field 55. The user can input any keyword into the keyword input field 53.

FIG. 3A illustrates an example where a keyword (for example, "file format") is inputted. This example assumes a situation where the user wants to know in which file format the scanned data can be saved during use of the scan function of the MFP 5, and the user tries to find the solution by using the help function.

As shown in FIG. 3A, when the keyword "file format" is inputted and then the search button 54 is pressed, the device controlling application 15 conducts help search based on a keyword which has been inputted in the keyword input field 53 (hereinafter, refer to as "user-input word") by the user. In other words, the help topic DB 15a is searched for a topic which meets "file format" as a user-input word. When the topic which meets "file format" is found by the help search, the topic is displayed in the help topic display field 55.

On the other hand, the topic which meets the user-input word is not necessarily found by the help search. In general, users do not frequently use help functions and, in many cases, version upgrade of the help topic DB 15a is not frequently conducted. Accordingly, there are cases that the information needed by the user is not found in the help topic DB 15a.

In such a case, the user at least can perform a Web search by starting the Web browser by him/herself and re-enter a necessary keyword. The user is also able to solve the situation by directly calling the call center of the vendor. However, such operation takes time and effort. Therefore, it is hard to say that the conventional help function is convenient.

By contrast, the help function of this embodiment is configured to automatically perform a search by using an external server when topic which meets the user-input word is not found in the help topic DB 15a as a result of the help search. Specifically, the help function selects either a search using the search engine of the search server 7 (Web search) or a search in an FAQ database in the vendor site of the vender server 8 (FAQ search), and performs the search.

The external search function in the help function includes at least two additional functions. One additional function is a server determination function for determining which one of the Web search and the FAQ search should be performed in accordance with a particular server determination method. Another additional function is a keyword addition function which allows adding at least one more specific keyword to the user-input word as a search keyword and which makes the external server perform a search.

In this embodiment, the keyword addition function includes: a case of adding a name of the active device (hereinafter, refer to as "active device name"); and another case of adding a name of the device controlling application 15 (for example, "XYZ application"; hereinafter, refer to as "application name") in addition to the active device name. Whether only the active device name is added or both the application name and the active device name are added will be determined depending on which one of the device controlling application 15 and the active device itself has a higher degree of relevance to the user-input word.

Specifically, it is determined whether the user-input word is included in the list of status message 15d. As seen from the above-described example of messages such as "Paper jam occurs", "Toner is running out", and "The cover is left open", a majority of such messages in the list of status message 15d has a higher degree of relevance to the device itself (which is controlled by the device controlling application 15) rather than the device controlling application 15.

Because of this, when the user-input word is included in the list of status message 15d, it is determined that the user-input word has a higher degree of relevance to the active device itself than the device controlling application 15, and the active device name will be added as a keyword. Then, the user-input word and the added active device name are transmitted together as keyword information to the server to which a search is requested.

On the other hand, when the user-input word is not included in the list of status message 15d, it is determined that the user-input word has a higher degree of relevance to the device controlling application 15 rather than the device itself; then the active device name and the application name are added as the keyword. Then, the user-input word together with the added active device name and application name are transmitted to the server to which a search is requested.

In this embodiment, regarding the server determination function, a server is determined based on which one of the device controlling application 15 and the active device itself has a higher degree of relevance to the user-input word. In this embodiment, the information provided as FAQ topic in the vendor site includes more information about the device itself than information about the device controlling application 15. That is, the FAQ topic received from the vendor site has a higher degree of relevance to the device itself.

Because of this, when the user-input word is included in the list of status message 15d (in other words, the user-input word has a higher degree of relevance to the active device itself than the device controlling application 15), the vendor server 8 is determined to be the server to which a search is requested. Thus, when the user-input word is included in the list of status message 15d, the user-input word and the active device name are transmitted as the keyword information to the vendor site. Then, the vendor site is searched for FAQ topics relevant to the keyword information.

On the other hand, when the user-input word is not included in the list of status message 15d (in other words, the user-input word has a higher degree of relevance to the device controlling application 15 than the device itself), the search server 7 is determined to be the server to which a search is requested. Thus, when the user-input word is not included in the list of status message 15d, the user-input word, the active device name, and the application name are transmitted as the keyword information to the search server 7. Then, FAQ topic relevant to the keyword information will be searched for by the search engine.

Specific examples of screens shown when a search is requested to the external server will be described in detail with reference to FIGS. 3A to 6B. As shown in FIG. 3A, assume that when executing a help search in a state where a keyword "file format" is inputted in the keyword input field 53 of the help screen 50, an appropriate topic is not found in the help topic DB 15a. In this case, the device controlling application 15 determines whether the user-input word "file format" is included in the list of status message 15d. If the user-input word is not included, as shown in FIG. 3B, the active device name and the application name are automatically added as keywords in the keyword input field 53 and then a Web-search confirmation screen 60 is displayed over a part of the help screen 50.

The Web-search confirmation screen 60 shows a confirmation message 61, an execution button 62, and a cancel button 63. The confirmation message 61 includes a message informing that no topic related to the user-input word has been found by the help search, keyword information in which an active device name and an application name are added to the user-input word, a message questioning whether a Web search should be performed based on the keyword information, and so on.

In the Web-search confirmation screen 60, when the user press the cancel button 63, the Web-search confirmation screen 60 temporarily disappears, and content of the keyword input field 53 in the help screen 50 becomes changeable by the user. Under this situation, if necessary, the user can change the keyword information. Then, if the user press the search button 54 again, the Web-search confirmation screen 60 is displayed again. At this time, if the keyword information is changed by the user, the latest keyword information after the change is shown in the confirmation message 61.

In the Web-search confirmation screen 60, when the user presses the execution button 62, the device controlling application 15 starts the Web browser 16 and automatically accesses the search engine of the search server 7. Then, the device controlling application 15 specifies keyword information on the search engine and requests a search based on the keyword information. In other words, the device controlling application 15 automatically executes, on behalf of the user, a normal search procedure in which the user firstly starts a Web browser and accesses the search engine, and then the user directly input the above-described keyword information as the search keyword to execute the search.

Figure 4:
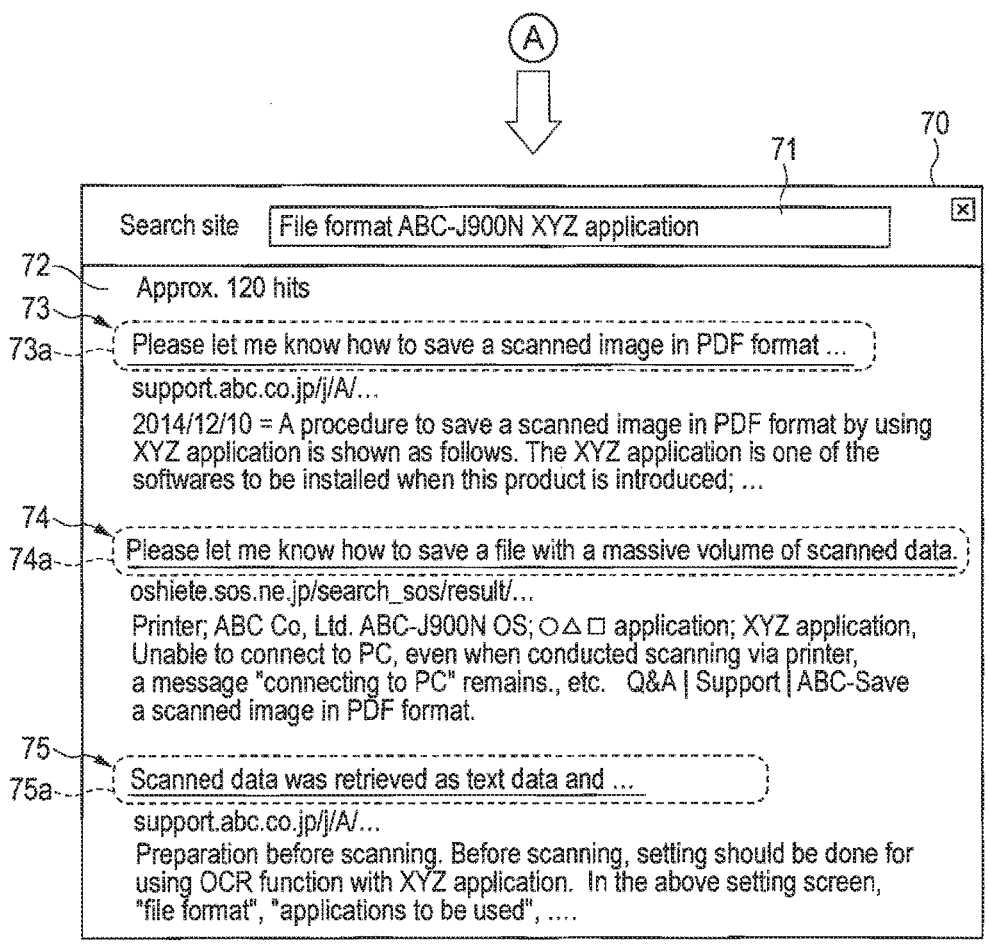
FIG. 4 is an explanatory diagram showing a Web search screen.

Consequently, a Web search screen 70 shown in FIG. 4 is displayed on the PC 3. The Web search screen 70 is a screen displayed by the Web browser 16, on which a Web search result 72 is shown as a result of the search performed by the search engine based on the keyword information. The Web search result 72 shows a plurality of page information 73, 74, 75 . . . as a result of the search related to the keyword information. At the top of each page information 73, 74, 75 . . . , page titles 73a, 74a, 75a . . . are respectively shown. To these page titles 73a, 74a, 75a . . . , corresponding Web page URL addresses are hyper-linked, respectively. Because of this, if any one of the page title is clicked, detailed information can be received from a Web site linked to the page title and the information can be displayed.

Next, an example of screens shown when an FAQ search is conducted will be described. FIG. 5A shows an example of a situation where a keyword (for example, "paper jam") is inputted. This example assumes a situation where a paper jam of a recording paper has occurred in the MFP 5 during usage of the printing function of the MFP 5 by the user and then the user tries to find out the solution of paper jam by using the help function.

As shown in FIG. 5A, assume that, when executing the help search under a situation where a keyword "paper jam" has been inputted in the keyword input field 53 of the help screen 50, an appropriate topic is not found in the help topic DB 15a. In such a case, the device controlling application 15 determines whether the user-input word "paper jam" is included in the list of status message 15d. If the user-input word is included, as shown in FIG. 5B, the active device name is automatically added to the keyword in the keyword input field 53. In addition, an FAQ-search confirmation screen 80 is displayed over a part of the help screen 50.

Similar to the Web-search confirmation screen 60 (see FIG. 3B), the FAQ-search confirmation screen 80 shows a confirmation message 81, an execution button 82, and a cancel button 83. The keyword information included in the confirmation message 81 of the FAQ-search confirmation screen 80 is the user-input word and the active device name.

In the FAQ-search confirmation screen 80, when the user press the cancel button 83, the Web-search confirmation screen 80 temporarily disappears, and the content of the keyword input field 53 in the help screen 50 becomes changeable by the user. Then, if the user press the search button 54 again, the FAQ-search confirmation screen 80 is displayed again. At this time, if the keyword information is changed by the user, the latest keyword information after the change is shown in the confirmation message 81.

In the FAQ-search confirmation screen 80, when the user presses the execution button 82, the device controlling application 15 starts the Web browser 16 and automatically accesses the vendor site of the vendor server 8. Then, the device controlling application 15 specifies the keyword information on the vendor site and requests a search in the FAQ topics based on the keyword information.

Figure 6A:
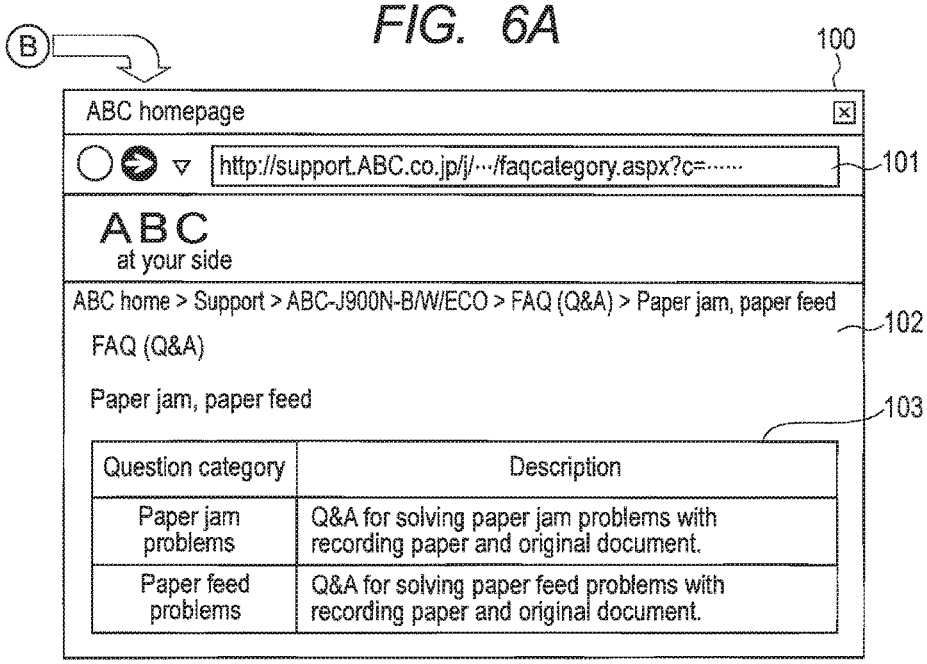
FIG. 6A is an explanatory diagram showing an FAQ page screen.

Consequently, an FAQ page screen 100 like an example shown in FIG. 6A is displayed on the PC 3. The FAQ page screen 100 is a screen displayed by the Web browser 16. The FAQ page screen 100 shows an FAQ page 102 as a result of the FAQ search in the vendor site. The FAQ page screen 100 also shows an FAQ page address 101 as a URL address indicative of the location of the FAQ page 102.

The FAQ page 102 shows a list of FAQ topic link list 103 for accessing FAQ topics related to the specified device name "ABC-J900N" and the keyword "paper jam". The list of FAQ topic link list 103 shows, among various FAQ topics of the vendor site, items (categories) of the FAQ topics related to "paper jam" of the device name "ABC-J900N" and the summary thereof, and hyperlinks are set appropriately. As a result, if needed, the user can receive more detailed FAQ topics related to paper jam of the particular device.

Usually, the user starts up a Web browser to access the vendor site and then traces the links to a page that includes the FAQ topics related to "paper jam" regarding the device "ABC-J900N" from the main page of the vendor site as a starting point. These operations are automatically performed by cooperation between the device controlling application 15 and the vendor site.

On the other hand, if the FAQ topics related to the keyword information are not found in the FAQ database of the vendor site as a result of the FAQ search, the device controlling application 15 shows a Web search confirmation screen 90 as shown in FIG. 5C instead of showing the FAQ-search confirmation screen 80. Similar to the Web-search confirmation screen 60 shown in FIG. 3B, the Web search confirmation screen 90 shows a confirmation message 91, an execution button 92, and a cancel button 93. The function of the Web search confirmation screen 90 is the same as that of the Web-search confirmation screen 60 shown in FIG. 3B.

In other words, when the FAQ topics related to the keyword information are not received from the vendor site, a Web search can be executed. In the Web search confirmation screen 90, if the user presses the execution button 92, the device controlling application 15 executes a Web search in a procedure similar to the case where the execution button 62 is pressed in the Web-search confirmation screen 60 shown in FIG. 3B.

Figure 6B:
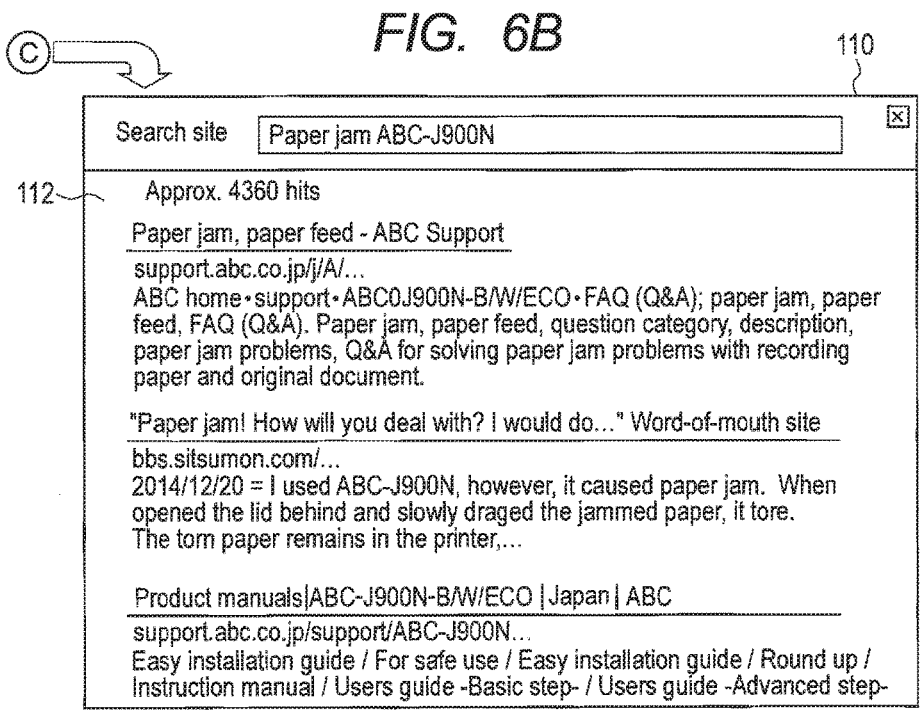
FIG. 6B is an explanatory diagram showing a Web search screen.

As a result, the PC 3 displays a Web search screen 110 as shown in FIG. 6B. Similar to the Web search screen 70 shown in FIG. 4, the Web search screen 110 shows a Web search result 112 as a search result based on the keyword information by the search engine. The user can receive various kinds of information related to the keyword information by using the Web search screen 110 as a starting point.

(7) Main Processing of the Device Controlling Application

After receiving a start request of the device controlling application 15, the CPU 11 of the PC 3 reads the device controlling application 15 from the HDD 14. Specifically, firstly, the main screen 40 shown in FIG. 2A is displayed. Then, when the help button 47 in the main screen 40 is pressed, the CPU 11 executes a help process as a part of the device controlling application 15. The detailed content of the help process is shown in FIG. 7.

Figure 7:
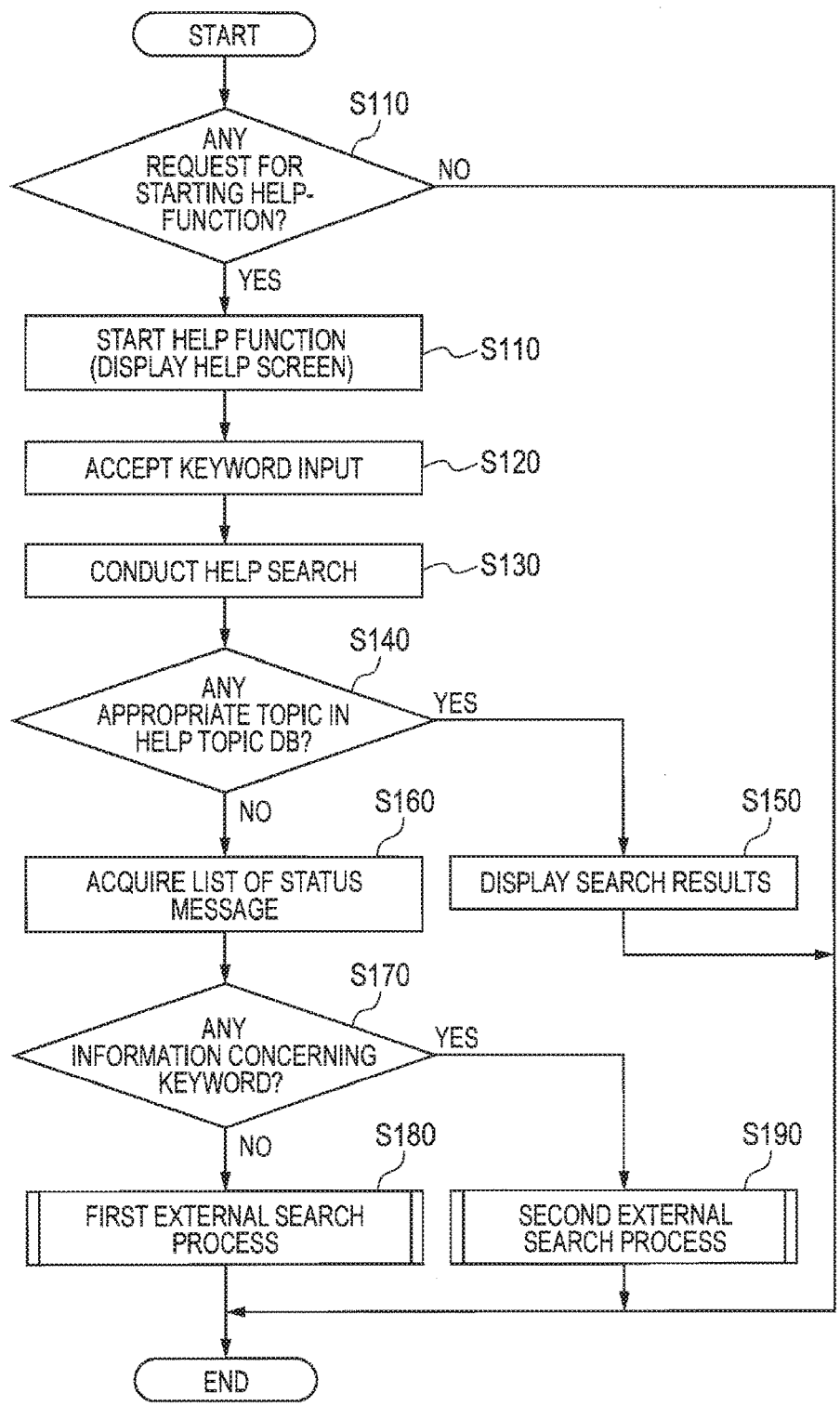
FIG. 7 is a flowchart showing a help process.

When starting the help process shown in FIG. 7, the CPU 11 starts the help function (S110). Specifically, the help screen 50 (see FIG. 2B) is shown. In S120, the CPU 11 accepts the keyword inputted by the user into the keyword input field 53 in the help screen 50. In S130, the CPU 11 executes a help search based on the user-input word inputted by the user in S120. More specifically, the CPU 11 executes the help search when the search button 54 in the help screen 50 is pressed.

In S140, the CPU 11 determines whether any appropriate topics related to the user-input word exist in the help topic DB 15a. If any appropriate topics are found, the CPU 11 shows the appropriate topics in the help topic display field 55 in the help screen 50 (S150). If no appropriate topic has been found (that is, if there is no result (search result) that matches the user-input word in the help topic DB 15a), the CPU 11 receives information from the list of status message 15d (S160). Then, in S170, the CPU 11 determines whether the user-input word is included in the list of status message 15d. If the user-input word is not included in the list of status message 15d, the process advances to a first external search process (S180). If the user-input word is included in the list of status message 15d, the process advances to a second external search process (S190).

Figure 8:
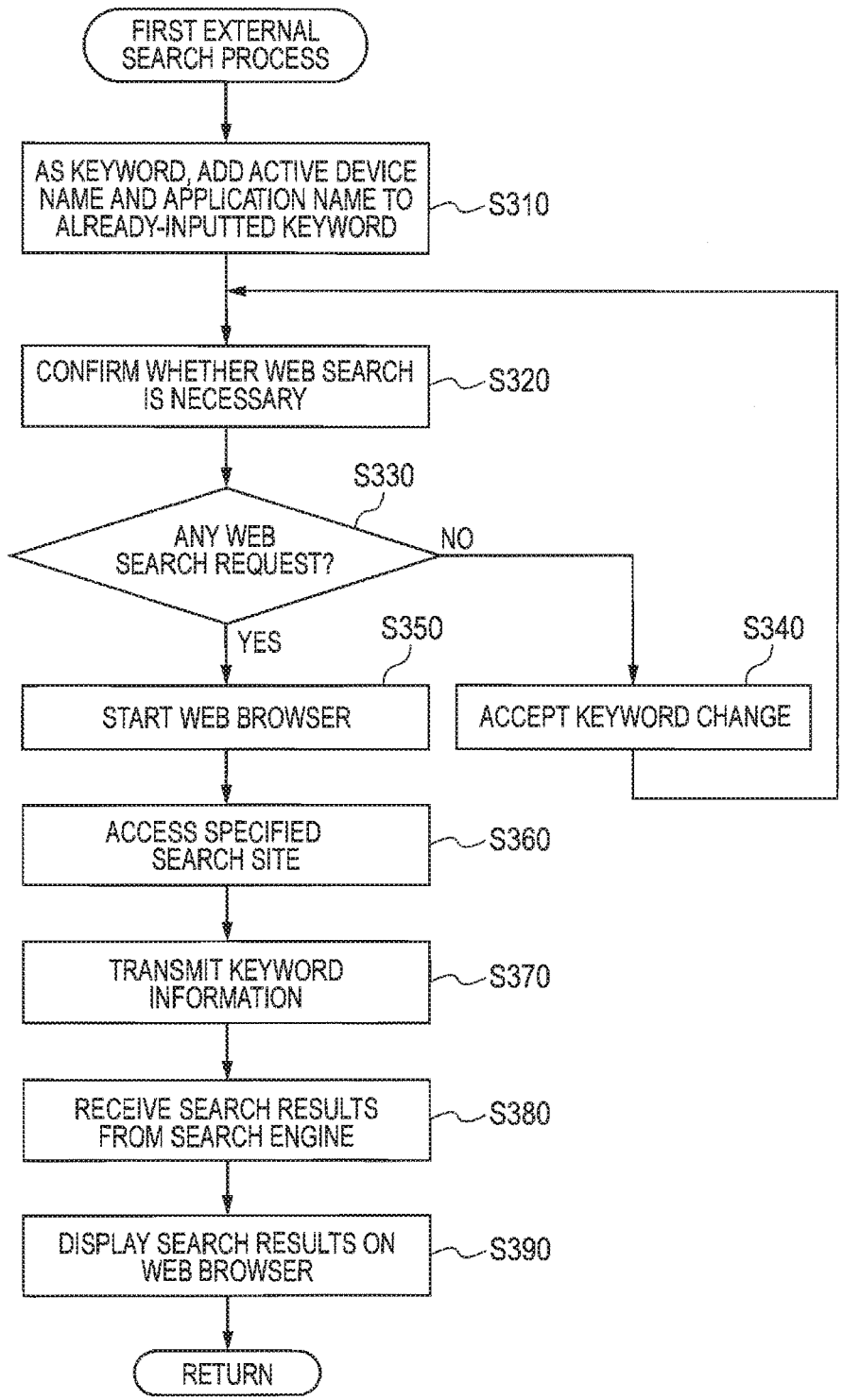
FIG. 8 is a flowchart showing details of a first external search process in S180 of FIG. 7.

The first external search process (S180) will be described in detail with reference to FIG. 8. As shown in FIG. 8, in S310 in the first external search process, the CPU 11 adds the active device name and the application name to the keyword already inputted by the user (i.e. user-input word), as the keyword of the keyword input field 53 (see FIG. 3B).

In S320, the CPU 11 asks the user (confirms with the user) whether the Web search is necessary. Specifically, the CPU 11 displays the Web-search confirmation screen 60 (see FIG. 3B). In S330, the CPU 11 determines whether a Web search has been requested by the user. If the Web search has not be requested, namely, if the cancel button 63 has been pressed in the Web-search confirmation screen 60, the process advances to S340. In S340, the CPU 11 receives a change operation of keyword performed by the user in the keyword input field 53 of the help screen 50. Then, when the search button 54 is pressed again, the process returns to S320.

When a request for Web search is made by the user in S330, the CPU 11 starts the Web browser 16 in S350. In S360, access is made to a specified search site. In this embodiment, based on a predetermined search engine address 15c, access is made to the search engine of the search server 7. Then, in S370, the CPU 11 transmits, to the search engine, the keyword information displayed in the keyword input field 53 of the help screen 50, and requests a Web search based on the keyword information. Consequently, a Web search based on the keyword information is executed by the search engine, and the Web search result is transmitted to the PC 3.

In S380, the CPU 11 receives the Web search result received from the search engine from the search server 7. In S390, the CPU 11 displays the Web search result received in S380 on the Web browser 16. Specifically, the Web search screen 70 (see FIG. 4) is displayed.

Figure 9:
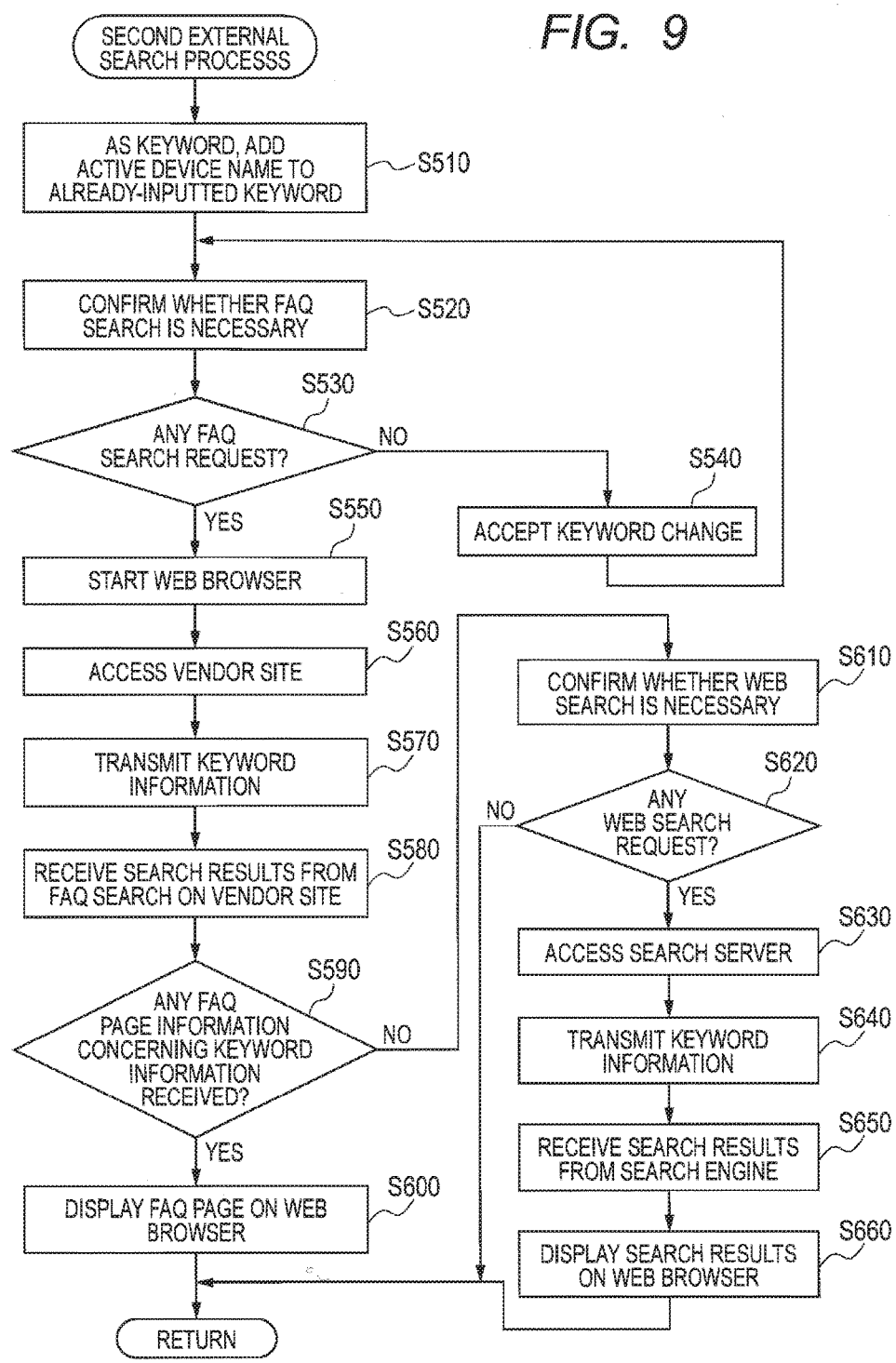
FIG. 9 is a flowchart showing details of a second external search process in S190 of FIG. 7.

Next, the second external search process (S190: see FIG. 7) will be described in detail with reference to FIG. 9. As shown in FIG. 9, in S510 in the second external search process, the CPU 11 adds the active device name to the keyword already inputted by the user (i.e. user-input word) (see FIG. 5B), as the keyword of the keyword input field 53.

In S520, the CPU 11 asks the user (confirms with the user) whether the FAQ search is necessary. Specifically, the CPU 11 displays the FAQ-search confirmation screen 80 (see FIG. 5B). In S530, the CPU 11 determines whether an FAQ search has been requested by the user. If the FAQ search has not been requested, namely, if the cancel button 83 has been pressed in the FAQ-search confirmation screen 80, the process advances to S540. In S540, the CPU 11 receives a change operation of keyword performed by the user in the keyword input field 53 of the help screen 50. Then, when the search button 54 is pressed again, the process returns to S520.

When a request for FAQ search is made by the user in S530, the CPU 11 starts the Web browser 16 in S550. In S560, access is made to the vendor site of the vendor server 8. Then, in S570, the CPU 11 transmits, to the vendor site, the keyword information displayed in the keyword input field 53 of the help screen 50, and requests an FAQ search based on the keyword information. Consequently, an FAQ search based on the keyword information is executed by the vendor site, and the FAQ search result is transmitted to the PC 3.

In S580, the CPU 11 receives the FAQ search result received from the vendor site from the vendor server 8. In S590, based on the FAQ search result received in S580, the CPU 11 determines whether the FAQ page information related to the keyword information has been received. When the FAQ page information has been received, namely, the FAQ topics related to the keyword information exist in the FAQ database (S590: YES), in S600, the CPU 11 displays FAQ pages indicated by the received FAQ page information on the Web browser 16. Specifically, the FAQ page screen 100 (see FIG. 6A) is displayed.

When the FAQ page information has not been received, that is, the FAQ topics related to the keyword information do not exist in the FAQ database (S590: NO), in S610, the CPU 11 asks the user (confirms with the user) whether the Web search is necessary. Specifically, the Web search confirmation screen 90 (see FIG. 5C) is displayed. In S620, the CPU 11 determines whether the Web search has been requested by the user. If the Web search has not been requested, in other words, the cancel button 93 of the Web-search confirmation screen 90 is pressed, the CPU 11 ends the second external search process. Note that when the cancel button 93 is pressed, similar to the first external search process (see FIG. 8), the CPU 11 may accept change of the keyword and again ask whether the Web search is necessary.

When the Web search has been requested by the user in S620, access is made to the search engine of the search server 7 in S630. Then, in S640, the CPU 11 transmits, to the search engine, the keyword information displayed in the keyword input field 53 of the help screen 50, and requests a Web search based on the keyword information. Thus, the Web search based on the keyword information is executed by the search engine, and the Web-search results are transmitted to the PC 3.

In S650, the CPU 11 receives the Web search result received from the search engine from the search server 7. In S660, the CPU 11 displays the Web search result received in S650 on the Web browser 16. Specifically, the Web search screen 110 (see FIG. 6B) is displayed.

(8) FAQ Search Process by the Vendor Site

Next, an FAQ search process performed by the vendor site of the vender server 8 will be described with reference to FIG. 10. In the vendor site of the vendor server 8, the FAQ search process shown in FIG. 10 is periodically performed. When the FAQ search process shown in FIG. 10 is started in the vender server 8, in S710, the vender server 8 determines whether keyword information has been received from the information processing apparatus that executes the device controlling application, the keyword information being transmitted by the processes of the device controlling application.

If the keyword information has not been received, other various processes will be executed in S760 as necessary. When the keyword information (for example, "Paper jam ABC-J900N") has been received, in S720, the vender server 8 identifies the FAQ database corresponding to the active device name (for example, "ABC-J900N") included in the keyword information, and searches the FAQ database for an FAQ topic including the keyword (for example, "paper jam") other than the active device name in the keyword information.

In S730, the vender server 8 determines whether any appropriate FAQ topics have been found as a search result of S720. If any appropriate FAQ topics are found, in S740, the vender server 8 transmits FAQ page information (for example, URL) to the device controlling application (namely, to the information processing apparatus in which the device controlling application is executed). The FAQ page information is used for the device controlling application having requested the FAQ search to access the appropriate FAQ topics.

In S730, if the appropriate FAQ topics have not been found as a result of the S720 search, in S750, the vender server 8 transmits, to the device controlling application having requested the FAQ search, information indicating that no appropriate FAQ topics have been found.

(9) Effect of the Embodiment

According to the help function provided in the device controlling application 15 of the above-described embodiment, a search using an external server is not performed from the beginning; first of all, a help search based on the user-input word in the help topic DB 15a is performed.

Then, if no topic related to the user-input word has been found as a result of the help search, a search using the external server will be automatically performed. At that time, the user-input word is not simply transmitted to the external server, but at least one of the active device name and the application name is added to the user-input word and these keywords are transmitted to the server all together as the keyword information.

Consequently, the server executes a search for information based on a plurality of keywords included in the keyword information. Note that the search based on a plurality of the keywords in the server may be so-called "OR search" which conducts search based on at least one information out of a plurality of keywords, or it may be so-called "AND search" which conducts search based on all the information including the plurality of the keywords.

Because of this, according to the device controlling application 15 of the above embodiment, it is possible to efficiently receive information related to the device itself, the method for controlling the device, and the like that the user requires by suppressing the data communication between the PC 3 and the external server.

Moreover, in the above embodiment, at least one of the search server 7 having the search engine and the vendor server 8 having the vendor site is used as the external server. In the vendor site, an FAQ database related to various products (including MFP 5) provided by the vendor of the MFP 5 is prepared, and the vendor site has a function to execute an FAQ search as required from the outside. In addition, when requesting the vendor site to perform a search, at least the active device name is added to the keyword information.

Thus, by requesting the vendor site to perform a search, it is possible to efficiently receive the FAQ topics including the user-input word among the FAQ topics related to the active device.

On the other hand, if a search engine is used, since the search will be performed within a wider scope than that of at least the above-described FAQ search, more information can be received. Particularly, in the above-described embodiment, when requesting a Web search by the search engine, at least the active device name and the application name as the keyword information are added. Accordingly, it is possible to receive a wider scope of information related to the active device, the device controlling application 15, and the user-input word, by requesting a Web search performed by the search engine.

Further, which one of the FAQ search and the Web search should be performed is automatically determined based on the user-input word. Specifically, when the user-input word is included in the list of status message 15d (in other words, relevance between the user-input word and the MFP 5 itself is relatively high), an FAQ search is performed. On the contrary, if the user-input word is not included in the list of status message 15*d* (in other word, relevance between the user-input word and the device controlling application 15 is relatively high), a Web search is performed.

By determining the search method in this way, the information related to the user-input word can be received more accurately. Besides, if no FAQ topic has been found as a result of the FAQ search, the Web search is automatically executed. Therefore, even when relevance between the user-input word and the MFP 5 itself is high, eventually, the information related to the user-input word can be efficiently and reliably received.

<Modifications>

While the disclosure has been described in detail with reference to the above aspects thereof, it would be apparent to those skilled in the art that various changes and modifications may be made therein without departing from the scope of the claims.

(1) The keyword, which is automatically added when no topic related to the user-input word has been found by the help search in the help topic DB 15*a*, is not limited to the active device name and the application name.

An example thereof may be to extract other words related to the user-input word by using a particular algorithm and to add the extracted words. Another example thereof may be to receive the monitoring information of the device from the status monitor (status monitoring function), to determine whether there is malfunction with the device based on the monitoring information, and to add a word indicating the malfunction when there is malfunction with the active device. In such a case, a word indicating the malfunction may not be added unconditionally, but the word indicating the malfunction may be added if the malfunction is related to the user-input word.

As long as appropriately determining what sort of information the user requires from the user-input word as a starting point and being capable of accurately receiving the required information, the number and the content of other keywords to be added other than the user-input word can be appropriately determined.

(2) In the Web-search confirmation screen 60 as shown in FIG. 3B, when the cancel button 63 is pressed, the FAQ search may be prompted to the user. In other words, the device controlling application 15 displays a screen similar to the FAQ-search confirmation screen 80 as shown in FIG. 5B, and makes inquiry to the user about whether the FAQ search should be performed on the same keyword information. Then, when the search button is pressed, the FAQ search may be performed.

(3) To the contrary, in the FAQ-search confirmation screen 80 as shown in FIG. 5B, when the cancel button 83 is pressed, the Web search may be prompted to the user. When shifting from the help search to the external server, various methods can be used for determining which one of the FAQ search and the Web search should be performed first. In other words, the method for determining server is not limited to the above-described method in which the server is determined based on whether the user-input word is included in the status message list 15*d*.

For example, an FAQ search may be performed first regardless of whether the user-input word is included in the list of status message 15*d*. Another example may be a method including: starting two windows of the Web browser 16; and performing an FAQ search on one window and a Web search on the other window. Moreover, another example may be a method including: asking the user about which one of the FAQ search and the Web search the user wishes to perform; and performing the search selected by the user.

(4) When no appropriate FAQ topic corresponding to the keyword information has been found as a result of the FAQ search by press of the execution button 82 in the FAQ-search confirmation screen 80 shown in FIG. 5B, the Web search may be forcibly performed without asking the user whether the Web search is necessary by the Web search confirmation screen 90 in FIG. 5C.

(5) The present disclosure is not limited to the device controlling application 15 for controlling the MIT 5. The disclosure can be used for any kind of device controlling applications for controlling a device from an information processing apparatus, regardless of the types and numbers of the device to be controlled. In a case where the device controlling application or the like is installed in the device itself, too, the present disclosure can be applied to that application.

(6) In addition, a function of one constituent element in the above-described embodiment may be divided into a plurality of elements; a function of the plurality of elements may be integrated to one element. Moreover, at least a part of configurations of the above-described embodiment may be replaced with a known configuration having a similar function. Furthermore, a part of configurations in the above-described embodiment may be omitted. A part of configurations in one embodiment may be added or may substitute to configurations of another embodiment.

What is claimed is:

1. A non-transitory computer-readable storage medium storing a device controlling program executable by a processor of an information processing apparatus, the information processing apparatus being configured to be connected to a device and a server, the device controlling program causing, when executed, the processor to perform:

receiving input of an input word;

searching a database stored in a memory of the information processing apparatus, the database being a collection of topics related to function information including at least one of a function of the device controlling program and a function of the device;

determining whether a topic relating to the input word exists in the database;

in response to determining that the topic relating to the input word exists in the database, displaying the topic relating to the input word on a display of the information processing apparatus;

in response to determining that no topic relating to the input word exists in the database, determining a search word including the input word and a related word identifying at least one of the device controlling program and the device, and transmitting, through a network, a search request to the server for a search result, the search request including the search word; and in response to receiving the search result from the server, displaying the search result on the display of the information processing apparatus.

2. The storage medium according to claim 1, wherein the server comprises:

a first server storing a plurality of device function information that is information relating to functions of the device; and a second server having a search engine configured to search information;

wherein the device controlling program causes, when executed, the processor to perform:

in response to determining that no topic relating to the input word exists in the database, determining either one of the first server and the second server as a transmission-destination server to which the search request is to be transmitted; and transmitting the search request to the transmission-destination server.

3. The storage medium according to claim 2, wherein the device controlling program causes, when executed, the processor to perform:

in response to determining that no topic relating to the input word exists in the database, determining which of the function of the device controlling program and the function of the device has a higher degree of relevance relative to the input word; and wherein determining the server for transmitting the search request comprises:
in response to determining that the function of the device has a higher degree of relevance relative to the input word, determining the first server as the transmission-destination server; and
in response to determining that the function of the device controlling program has a higher degree of relevance relative to the input word, determining the second server as the transmission-destination server.

4. The storage medium according to claim 3, wherein the memory stores device-related information relating to a state of the device; and wherein
when the device-related information includes information relating to the input word, the function of the device has a higher degree of relevance relative to the input word; and
when the device-related information includes no information relating to the input word, the function of the device controlling program has a higher degree of relevance relative to the input word.

5. The storage medium according to claim 2, wherein the device controlling program causes, when executed, the processor to perform:

when the first server is determined as the transmission-destination server and the search request is transmitted to the first server, and when the device function information relating to the search word is not received from the first server, transmitting the search request to the second server for the search result; and wherein in response to receiving from the second server the search result, displaying the search result on the display.

6. The storage medium according to claim 2, wherein when the transmission-destination server is the first server, the device controlling program causes, when executed, the processor to perform determining at least a word indicative of a model of the device as the related word.

7. The storage medium according to claim 2, wherein when the transmission-destination server is the second server, the device controlling program causes, when executed, the processor to perform determining at least a word indicative of the device controlling program as the related word.

8. The storage medium according to claim 2, wherein when the transmission-destination server is the second server, the device controlling program causes, when executed, the processor to perform determining both a word indicative of a model of the device and a word indicative of the device controlling program as the related word.

9. The storage medium according to claim 2, wherein the device controlling program further causes, when executed, the processor to perform:

when the first server is determined as the transmission-destination server,
receiving input of whether to transmit the search request to the first server for the search result; and
in response to receiving input of not transmitting the search request to the first server for the search result, receiving input of whether to transmit the search request to the second server for the search result; and when the second server is determined as the transmission-destination server,
receiving input of whether to transmit the search request to the second server for the search result; and
in response to receiving input of not transmitting the search request to the second server for the search result, receiving input of whether to transmit the search request to the first server for the search result.

10. The storage medium according to claim 1, wherein the device controlling program has a status monitor to monitor operation of the device; and wherein the device controlling program further causes, when executed, the processor to perform:
receiving monitoring information of the device from the status monitor;
determining whether there is malfunction with the device, based on the monitoring information; and
in response to determining that no topic relating to the input word exists in the database and that there is malfunction with the device, adding a word indicating the malfunction to the search word.

11. A device controlling method usable on an information processing apparatus configured to be connected to a device and a server, the device controlling method comprising:

receiving input of an input word;
searching a database stored in a memory of the information processing apparatus, the database being a collection of topics related to function information including at least one of a function of the device controlling program and a function of the device;
determining whether a topic relating to the input word exists in the database;
in response to determining that the topic relating to the input word exists in the database, displaying the topic relating to the input word on a display of the information processing apparatus;
in response to determining that no topic relating to the input word exists in the database, determining a search word including the input word and a related word identifying at least one of the device controlling program and the device, and transmitting, through a network, a search request to the server for a search result, the search request including the search word; and
in response to receiving the search result from the server, displaying the search result on the display of the information processing apparatus.

12. A device controlling apparatus comprising:
a display configured to display information;
a communicator configured to perform data communication with a device and a server;
a processor; and
a memory storing a device controlling program for controlling the device, the memory further storing function information that is information including at least one of a function of the device controlling program and a function of the device, the device controlling program comprising instructions, when executed by the processor, causing the processor to perform:
receiving input of an input word;
searching a database stored in the memory, the database being a collection of topics related to function information including at least one of a function of the device controlling program and a function of the device;
determining whether a topic relating to the input word exists in the database;
in response to determining that the topic relating to the input word exists in the database, displaying the topic relating to the input word on a display of the information processing apparatus;
in response to determining that no topic relating to the input word exists in the database, determining a search word including the input word and a related word identifying at least one of the device controlling program and the device, and transmitting, through a network, a search request to the server for a search result, the search request including the search word; and
in response to receiving the search result from the server, displaying the search result on the display.

13. The device controlling apparatus according to claim 12, wherein the server comprises:
a first server storing a plurality of device function information that is information relating to functions of the device; and
a second server having a search engine configured to search information;
wherein the device controlling program causes, when executed, the processor to perform:
in response to determining that no topic relating to the input word exists in the database, determining either one of the first server and the second server as a transmission-destination server to which the search request is to be transmitted; and
transmitting the search request to the transmission-destination server.

14. The device controlling apparatus according to claim 13, wherein the device controlling program causes, when executed, the processor to perform:
in response to determining that no topic relating to the input word exists in the database, determining which of the function of the device controlling program and the function of the device has a higher degree of relevance relative to the input word; and
wherein determining the server for transmitting the search request comprises:
in response to determining that the function of the device has a higher degree of relevance relative to the input word, determining the first server as the transmission-destination server; and
in response to determining that the function of the device controlling program has a higher degree of relevance relative to the input word, determining the second server as the transmission-destination server.

15. The device controlling apparatus according to claim 14, wherein the memory stores device-related information relating to a state of the device; and
wherein
when the device-related information includes information relating to the input word, the function of the device has a higher degree of relevance relative to the input word; and
when the device-related information includes no information relating to the input word, the function of the device controlling program has a higher degree of relevance relative to the input word.

16. The device controlling apparatus according to claim 13, wherein the device controlling program causes, when executed, the processor to perform:
when the first server is determined as the transmission-destination server and the search request is transmitted to the first server, and when the device function information relating to the search word is not received from the first server, transmitting the search request to the second server for the search result; and
wherein in response to receiving from the second server the search result, displaying the search result on the display.

17. The device controlling apparatus according to claim 13, wherein when the transmission-destination server is the first server, the processor is configured to determine at least a word indicative of a model of the device as the related word.

18. The device controlling apparatus according to claim 13, wherein when the transmission-destination server is the second server, the processor is configured to determine at least a word indicative of the device controlling program as the related word.

19. The device controlling apparatus according to claim 13, wherein when the transmission-destination server is the second server, the processor is configured to determine both a word indicative of a model of the device and a word indicative of the device controlling program as the related word.

20. The device controlling apparatus according to claim 13, wherein the device controlling program further causes, when executed, the processor to perform:
when the first server is determined as the transmission-destination server,
receiving input of whether to transmit the search request to the first server for the search result; and
in response to receiving input of not transmitting the search request to the first server for the search result, receiving input of whether to transmit the search request to the second server for the search result; and
when the second server is determined as the transmission-destination server,
receiving input of whether to transmit the search request to the second server for the search result; and
in response to receiving input of not transmitting the search request to the second server for the search result, receiving input of whether to transmit the search request to the first server for the search result.

* * * * *